US007623244B2

(12) United States Patent
Stein et al.

(10) Patent No.: US 7,623,244 B2
(45) Date of Patent: Nov. 24, 2009

(54) APPARATUS FOR EXAMINING DOCUMENTS

(75) Inventors: Dieter Stein, Holzkirchen (DE); Bernd Wunderer, München (DE)

(73) Assignee: Giesecke & Devrient GmbH, München (DE)

( * ) Notice: Subject to any disclaimer, the term of this patent is extended or adjusted under 35 U.S.C. 154(b) by 119 days.

(21) Appl. No.: 11/660,269

(22) PCT Filed: Aug. 16, 2005

(86) PCT No.: PCT/EP2005/008895

§ 371 (c)(1), (2), (4) Date: Oct. 1, 2007

(87) PCT Pub. No.: WO2006/018283

PCT Pub. Date: Feb. 23, 2006

(65) Prior Publication Data

US 2008/0123081 A1 May 29, 2008

(30) Foreign Application Priority Data

Aug. 17, 2004 (DE) ....................... 10 2004 039 827
Dec. 13, 2004 (DE) ....................... 10 2004 059 951

(51) Int. Cl.
*G01N 21/84* (2006.01)
*G01N 21/00* (2006.01)

(52) U.S. Cl. .................................... 356/429; 356/239.2

(58) Field of Classification Search .......... 356/426–431
See application file for complete search history.

(56) References Cited

U.S. PATENT DOCUMENTS 4,229,097 A * 10/1980 Vulmiere et al. .............. 355/35
4,490,618 A * 12/1984 Cielo .................... 250/559.01
4,675,727 A * 6/1987 Sekizawa et al. ............ 358/533

(Continued)

FOREIGN PATENT DOCUMENTS

DE 1222284 8/1966

(Continued)

OTHER PUBLICATIONS

International Search Report in PCT/EP2005/008895 (Aug. 17, 2004).

(Continued)

*Primary Examiner*—Gregory J Toatley, Jr.
*Assistant Examiner*—Jarreas C. Underwood
(74) *Attorney, Agent, or Firm*—Bacon & Thomas, PLLC

(57) ABSTRACT

The present invention relates to an apparatus (1) for examining documents (2), in particular banknotes. Therein the apparatus (1) comprises at least one light source (3), at least one spectral device (8) and at least two detection devices (9, 10, 11, 24). By means of the light source (3) the document (2) is irradiated and the light emitted and/or reflected and/or transmitted by the document (2) is subsequently divided into spectral components by means of the spectral device (8). The spectral components are separately detected by the detection devices. The spectral division of the light (4) emanating from the light source (3) can also be carried out before the light impinges on the document (2). The apparatus (1) is designed so as to individually weight the spectral components to be detected respectively by the detection devices (9, 10, 11, 24).

2 Claims, 6 Drawing Sheets

U.S. PATENT DOCUMENTS

| | | | | | |
|---|---|---|---|---|---|
| 4,936,684 | A * | 6/1990 | Keane | ........................ | 356/328 |
| 5,089,828 | A * | 2/1992 | Moss | ........................ | 343/725 |
| 5,280,333 | A * | 1/1994 | Wunderer | .................... | 356/71 |
| 5,465,243 | A * | 11/1995 | Boardman et al. | ....... | 369/53.29 |
| 5,504,575 | A * | 4/1996 | Stafford | ...................... | 356/330 |
| 5,870,229 | A | 2/1999 | Tsuchida | | |
| 6,647,140 | B1 * | 11/2003 | Wang et al. | ................. | 382/162 |
| 6,741,336 | B2 * | 5/2004 | Ahlers et al. | .................. | 356/71 |
| 6,768,123 | B2 * | 7/2004 | Giering | ................... | 250/458.1 |
| 6,937,322 | B2 * | 8/2005 | Gerz et al. | .................... | 356/71 |
| 7,257,288 | B1 * | 8/2007 | Strasser et al. | ................ | 385/24 |
| 7,259,792 | B2 * | 8/2007 | Terada | ........................ | 348/368 |
| 2001/0040211 | A1 | 11/2001 | Nagaoka | | |
| 2001/0055064 | A1 * | 12/2001 | Minakami | ................... | 348/222 |
| 2003/0031342 | A1 * | 2/2003 | Sperl et al. | .................. | 382/100 |
| 2003/0123049 | A1 | 7/2003 | Gerz et al. | | |
| 2003/0197233 | A1 | 10/2003 | Sakurai | | |
| 2004/0027682 | A1 | 2/2004 | Tsunetomo | | |

FOREIGN PATENT DOCUMENTS

| | | | |
|---|---|---|---|
| DE | 101 59 234 | A1 | 6/2003 |
| EP | 0 474 417 | A | 3/1992 |
| GB | 1 439 173 | A | 6/1976 |
| SU | 211830 | | 11/1968 |
| SU | 1569788 | A1 | 7/1988 |

OTHER PUBLICATIONS

Search Report EPO regarding 05 777 634.6-1229 (Feb. 8, 2008).

* cited by examiner

APPARATUS FOR EXAMINING DOCUMENTS

FIELD OF THE INVENTION

The present invention relates to an apparatus for the examination of documents, in particular sheet-shaped documents of value, such as banknotes, checks or the like. Furthermore, the present invention relates to a SELFOC lens for use in the examination of documents and a method for the production of a SELFOC lens with slit aperture.

Apparatus for the examination of documents are known in particular in regard of the verification of the authenticity of banknotes. Furthermore, such apparatus can for example be used in the sorting as well as the verification of the condition of banknotes. Depending on the currency and on the nominal value bank notes are equipped with different (security) features which can be verified fast and inexpensively by means of suitable apparatus.

DE 101 59 234 A1 describes such an apparatus for the verification of documents, in particular banknotes. Light irradiated on the document to be examined or emanating from the document to be examined, i.e. emitted and/or reflected and/or transmitted light is divided into spectral components by means of a spectral device. Therein spectral division means any type of transformation of a light ray or light beam with a specific spectral composition and direction into several light rays or light beams each having a different spectral composition and direction.

Individual, spatially separated detection devices each detect one spectral component of the light divided into spectral components. Through the division into spectral components otherwise necessary color filters in front of the detection devices can be omitted, whereby a simple and compact construction of the apparatus is achieved, and the apparatus can be used as a filterless detector.

When the spectral device is arranged between the light source and the document, an imaging optic, in particular a convex lens or at least one SELFOC lens is arranged between the document and the detection devices, in order to detect the spectral components of the light emanating from the document separately from each other by means of the detection devices. In the other case, when the spectral device is arranged between the document and the detection devices, for example SELFOC lenses are arranged between the document and the spectral device, in order to image the light emanating from (partial areas) of the banknote onto the spectral device.

The evaluation of the examined documents takes place by means of the intensities of the individual spectral components detected by the individual detection devices. However, due to the typically used detectors on a silicon basis the color detection of this filterless apparatus does not correspond to the color perception of the human eye. For the eye is more sensitive to some wavelengths than a corresponding silicon detector. A color-accurate evaluation of the examined document has so far been impossible without special filters.

Furthermore, the described combination of SELFOC lens and spectral device requires a slit aperture for the definition of the width of the imaged object, like every spectrometer in the case of an image with dispersion. This lens aperture cannot be disposed on the banknote itself and therefore an intermediate image of the object to be imaged has to be found in order to dispose the slit aperture there. One possibility of generating the intermediate image would be to arrange two SELFOC lenses in series, which would however double the construction length.

SUMMARY

This problem is solved by the independent claims. In claims dependent on these advantageous embodiments and further developments of the invention are specified.

Correspondingly the apparatus—like the above-mentioned state of the art—comprises a light source, a spectral device and at least two detection devices. By means of the light source a document to be examined is irradiated and the light emitted and/or reflected and/or transmitted by the document is subsequently divided into spectral components by means of the spectral device. These spectral components are detected separately by the detection devices. The spectral division of the light emitted by the light source can, if required, be carried out before the light impinges on the banknote—as already done in the state of the art.

Now in order to adapt the color sensitivity of the apparatus, to mention an example relevant in practice, to that of the human eye and to thus guarantee a color-accurate evaluation of documents, in particular banknotes, according to the invention the apparatus is designed for the individual weighting of the spectral components to be detected respectively by the detection devices. This can be achieved in different ways.

According to a first embodiment the dimension of the detection devices in a direction parallel to the spectral division, i.e. in the direction of dispersion, is chosen in dependence on the spectral component to be detected by means of the respective detection device. The dimension of the detection device therefore specifically means the dimension of the active, i.e. photosensitive detection layer of the detection device.

In this manner the spectral components are individually weighted due to the individual dimensions of the detection devices. Thus the spectrum really measured in the examination of the document by means of the detection devices is transformed into a modified spectrum which is for example adapted to the color perception of the human eye. According to the invention thus e.g. a detector line with pixel surfaces of different sizes can be provided.

According to a second embodiment, additionally or alternatively the distance between adjacent detection devices in a direction parallel to the spectral division is chosen in dependence on the spectral components to be detected respectively. In this manner the spectral components of the light detected by the detection devices are also weighted discriminatively. According to the invention it is thus possible to provide e.g. a detector line with pixel surfaces which do not only have different sizes, but which are also spaced apart from each other by different distances.

Through the change of the individual spacing the real spectrum is transformed into a modified spectrum in the examination. For example the apparatus can comprise three detection devices arranged side by side for detecting the visible light. In this case the detection devices are each arranged in one respective spectral range of the divided spectrum, one in the "blue" spectral range, one in the "green" spectral range and one in the "red" spectral range. In connection with the invention the designation of the individual spectral ranges "blue", "green" or "red" refers to a corresponding wavelength range, wherein the wavelength ranges can also overlap. In order to adapt the spectrum detected in the examination of the document for example to the color perception of the human eye, the spacing between the detection devices for the "blue"

and the "green" spectral range is chosen greater than the spacing between the detection devices for the "green" and the "red" spectral range.

However, the apparatus can also comprise more than three detection devices, for example in order to detect spectral components beyond the visible spectral range. E. g. four or even five detection devices can be arranged side by side, wherein three of the devices detect spectral components of the visible spectral range and one of the devices detects a spectral component of the infrared (IR) and/or ultraviolet (UV) spectral range. Therein one detection device for the detection of the IR spectral range is arranged beyond the detection device for the red spectral range and one detection device for the detection of e.g. the UV spectral range is arranged beyond the detection device for the blue spectral range. Also with such a four-color line sensor (red, green, blue, IR or UV) an approximation of the color perception of the human eye is possible without the interposition of filters, merely through the corresponding weighting of the spectral components detected in the visible spectral range. There is also the possibility to dispense with the color division of the three visible colors and only to carry out a division between the visible and the infrared or ultraviolet. Then the spectral components of the visible spectrum are added up and are further processed only as a sum.

The individual weighting of the spectral components to be detected respectively by the detection devices is not limited to the two above embodiments. Rather, a combination of the first and the second embodiment is particularly suitable to individually weight the spectral components. In this combination, in a direction parallel to the spectral division, i.e. in the dispersion direction, both the dimension of the detection devices and the spacing between adjacent detection devices is then chosen in dependence on the spectral component to be respectively detected by the corresponding detection device. Therein for example an increase of the spacing between two adjacent detection devices can accompany a decrease of the dimension of one or both detection devices. Through the decrease of the dimension in a certain range of the divided spectrum the sensitivity of the detection device for the corresponding wavelengths is correspondingly decreased. In the case that a detection device is less sensitive to e.g. longer wavelengths, such as is the case with a typical silicon-based detector, this decreased sensitivity can be compensated by an increased dimension of the detection device.

In a third embodiment the apparatus comprises a means for the individual weighting of the spectral components to be detected respectively by the detection devices. This can for example be carried out by means of data processing in hardware or software subsequent to the detection by the detection devices. The detected spectral components can thus be weighted depending on a spectrum to be simulated by means of weighting factors. This spectrum can for example correspond to the color perception of the human eye. It is an advantage of the weighting means that known apparatus for the examination of documents can be extended by means of such a means, in order to individually weight the spectral components detected by the detection devices. Therein the weighting of the spectral components can be carried out both dependent on and independent of the geometry of the detection devices. In this context, the geometry of the detection devices relates to their dimension and/or spacing from each other.

In a specific embodiment the apparatus comprises in addition to the at least one light source, the at least one spectral device and the at least one detection device furthermore at least one slit-shaped lens aperture and at least one SELFOC lens. In order to use the apparatus for measuring the spectrum of the light divided into spectral components by the spectral device, usually a defined slit for the light has to be given. The slit defines the visual field and the spectral resolution. The slit can be arranged directly behind the document, in order to form a limitation for the light diffusely reflected by the document before it impinges on the spectral device. Instead of using a lens aperture it would also be possible to irradiate the document in a slit shape, however, this alternative requires in practice, due to the typical variations of position of the document during the examination, a lighting means which coincides with the direction of observation and which is as a rule vertical. This can only be realized via a beam splitter and furthermore requires parallel light.

Moreover, not only several SELFOC lenses arranged in a row can be used, but preferably also several rows of SELFOC lenses with a corresponding offset between the individual rows. As a rule two-row lens arrays are commercially available whose rows are arranged side by side.

According to an independent aspect of the invention the lens aperture is arranged within the SELFOC lens, in particular in the center thereof. In this manner the document can also be illuminated over a large surface. Here, use is made of the fact that in the center of the longitudinal axis of each individual SELFOC rod lens a waist of the light rays passing through the lens is formed, so that the overall light emanating from an imaginary slit passes through the also slit-shaped lens aperture (slit aperture) which can have a smaller width than the slit itself.

For the optimum arrangement of the slit aperture within each SELFOC lens of a lens array the parameters affecting the ideal size of lens aperture and the tolerances affecting the ideal position of the lens aperture—relative to the optical axis—have to be known, which can for example be ascertained by means of an elaborate software simulation of a lens with a lens aperture. A suitable software can ascertain the positions and widths of the slit apertures to be allocated to the individual SELFOC lenses by means of "ray tracing" of the light rays emanating from the slit to be imaged up to the central plane of a two-row SELFOC array. Measurements with such software have shown that the maximum tolerance in regard of the slit width of the slit aperture is approximately 5% of the radius of a SELFOC lens, amounting to approximately +/−2 μm in the measurement carried out specifically.

The software measurements were carried out by means of a simulation of a two-row lens array, thus of two SELFOC lenses arranged side by side, since these are commercially available. The plane lying exactly centrally between the two optical axes of the lenses is hereinafter referred to as optical plane. Calculations of the admissible tolerances with a view to the spacing of the slit aperture of a lens to the optical plane of the SELFOC array had the result that in the specific example a maximum tolerance of +/−2.5 μm was admissible. When the two slit apertures of a two-row lens array are now observed together, it can be established that offsets of the right and the left slit image add up in the case of tolerances in an opposite direction and cancel each other out in the case of tolerances in the same direction. Therefore the measured tolerance is also valid for the spacing of the two slit apertures from each other on one common substrate. In the case that the pair of slit apertures is applied to one common substrate, a greater tolerance results due to the common direction for the position of the pair of slits in a direction perpendicular to the optical plane of the two-row SELFOC array, since a non-ideal position merely leads to a shift of the overall image. In the specific example the maximum admissible tolerance amounted to +/−5 μm.

In the following an inventive method is described by means of which it is possible to both achieve the arrangement of a slit aperture within the SELFOC lens and the optimum values with a view to the position and width of the lens aperture within the SELFOC lens. Therein, use is made of the fact that in the central plane of the SELFOC lens perpendicular to the optical axes a reduced intermediate image of a luminous slit (specified slit) of the desired pixel width is produced in the object plane. The crucial idea is to use the optical image of the specified slit through the half SELFOC lens itself for the photographical production of the lens aperture. With the aid of this method it is possible to dispense with calculations, since the unknown values directly affect the slit aperture to be produced and the slit aperture is thereby optimally adapted to the properties of the SELFOC lens.

First the SELFOC lens is split in a direction perpendicular to its optical axis in the center of its longitudinal axis. Subsequently three different variants are described in regard of the type and manner of arrangement of the slit aperture in the split SELFOC lens, thus in the center of the SELFOC lens.

In a first variant a positive photoresist is applied to a front surface of one of the two SELFOC lens halves. The photoresist is subsequently exposed through a slit in the object plane through the lens half pointing toward the object plane. Since the rays passing through the SELFOC lens intersect in the central plane of the SELFOC lens, thus in the location where the photoresist is arranged, the layer is only locally exposed. The photoresist is then developed and the developed portion of the photoresist represents the necessary slit aperture which is completely adapted to the properties of the SELFOC lens.

Since the photoresist is applied directly on the SELFOC lens, is thus firmly fixed to the lens, any subsequent adjustment steps of the slit aperture within the SELFOC lens can be dispensed with.

Since the application of the photoresist directly on the separation plane makes relatively high demands from a technical point of view, in a second variant the photoresist is applied to a separate substrate, wherein the substrate is for example a film or a glass plate. By the insertion of the substrate and the photoresist between the two parts of the SELFOC lens the length of the SELFOC lens is increased corresponding to the thickness of the substrate and the photoresist. Since the slit aperture is then no longer arranged centrally in relation to the longitudinal axis of the SELFOC lens, and the rays intersect in the center of the SELFOC lens as already described, undesirable results can be yielded. In order to prevent this, the thickness of the substrate is kept as small as possible and/or the SELFOC lens is shortened in one of its sides in such a way or is split from the outset in such a way that the inserted lens aperture is ultimately arranged centrally in relation to the longitudinal axis.

In a third variant the photoresist is also applied to a substrate, wherein the photoresist is a negative photoresist. Therein the substrate touches the inner side of the SELFOC lens half pointing toward the banknote. After the exposure and the development of the photoresist a single substrate can be used as a lift-off mask (coating mask) for a later metallization. The coating mask can also be used as a mask for the production of a whole batch of SELFOC lenses. However, the precondition for this is that the tolerances within the batch are small enough, so that the position of the slit aperture produced by the exposure lies in the admissible tolerance range for each individual fiber. Where the substrate and the photoresist serve as a coating mask for a plurality of slit apertures, the production of the slit aperture according to the third variant is all in all less expensive in comparison to the first and the second variant.

Due to scattered light within the lens, light rays outside the edge of the lens aperture surface to be produced can impinge on the light-sensitive layer.

In this case the profile of the lens aperture diverges from a rectangular profile and has oblique edges, since the scattered light on the edge has a lower density than the main beam. Thereby the imaging of the slit image is rendered indistinct, however such a profile offers some advantages in the case of an overlapping of different spectral components, since the overlapping is rendered “softer”. In this case the astigmatism of the deflection prism for producing a rounded slit image can be dispensed with in regard of the already described overall inventive apparatus. This has the advantage that for the division into spectral components direct vision prisms can be used which have a compact construction, and that a Wadsworth arrangement can be dispensed with.

After the SELFOC lenses were split and the slit aperture was inserted in the center of the SELFOC lens in accordance with one of the three described variants, the two parts of the SELFOC lens are assembled again, for example glued together. Approximately up to a value of 1/10 of the lens radius the offset of the two halves against each other does not have a significant influence on the intensity and definition of the images.

BRIEF DESCRIPTION OF THE DRAWINGS

Further characteristics and advantages of the invention will result from the following description of a variety of embodiments and alternative embodiments according to the invention in connection with the accompanying drawings. The figures are described as follows.

DETAILED DESCRIPTION OF THE DRAWINGS

Figure 1:
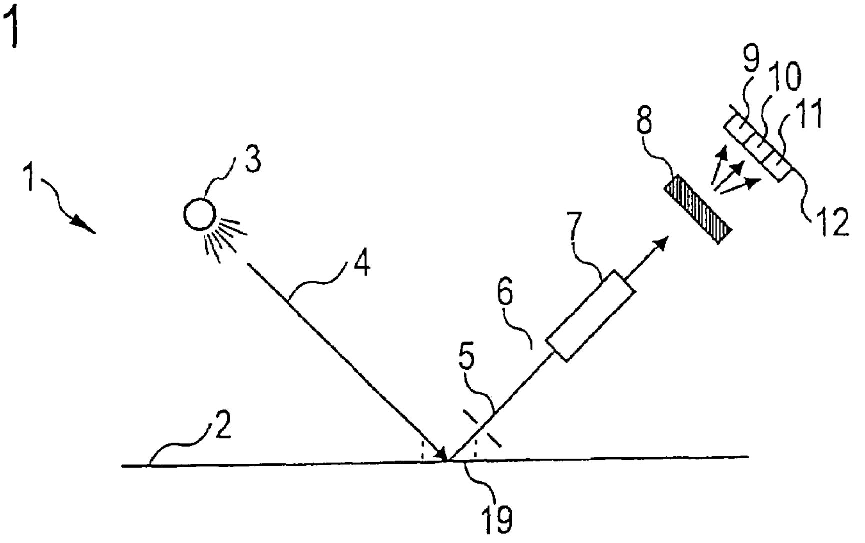
FIG. 1 a first embodiment of an apparatus for the examination of documents.

FIG. 1 shows a first embodiment of an apparatus 1 in which a document 2 to be examined, e.g. a banknote, is illuminated by the light 4 emitted by a light source 3. The light 5 remitted, i.e. diffusely reflected, by the document 2 passes through a lens aperture 6 provided for the limitation of the image field and is imaged by means of a row of SELFOC lenses 7 of which only the outermost is shown here, onto a spectral device 8.

SELFOC lenses are generally cylinder-shaped optical elements of a material which has a refraction index which decreases parabolically from the optical axis of the cylinder towards its mantle. Through the use of such lenses 7 a 1:1 imaging of the partial area 19 of the document 2 onto the spectral device 8 is achieved which is independent of the distance between the document and the image and which is free of any need for adjustment.

On the spectral device 8, which can for example be a prism, the light 5 is divided into individual spectral components. A prism is a transparent, wedge-shaped body which serves to deflect light rays. The prism can consist of glass, ceramics, quartz or also plastic. In order to optimize the efficiency and to avoid interference through reflexes, the prism can have a broadband anti-reflection coating on the entry surface and exit surface which is optimized for the average entry angle. The deflection angle of a prism is dependent on the refraction index of the material, the latter being dependent on the wavelength of the light, though. The prism divides (white) light into its spectral components.

These spectral components of the spectrally divided light exit the spectral device 8 in different directions which all lie in one common plane. This follows from the dependence of the refraction index on the wavelength, which is called dispersion. Therein the refraction index for longer waves (red) is smaller than that for shorter ones (blue). The dispersion of a prism is a material property. For example for a prism crown glass can be used which has an average refraction index n of approximately 1.52. The spectral components exiting the prism in different directions are then detected separately by correspondingly embodied detection devices 9, 10, 11, which are mounted on a common carrier 12. In FIG. 1 respectively only the outermost detection devices 9, 10, 11 of a row of detection devices 9, 10, 11 arranged side by side are shown, which respectively form one line detector for the line-by-line scanning of the document 2.

In connection with the invention instead of a simple 60° prism different prisms can be used as spectral device 8, of which in the following only the Wadsworth prism and the direct vision prism will be briefly explained. A Wadsworth prism consists of a prism with a mirror mounted parallel to the basis of the prism, which mirror serves to deflect the rays exiting the prism. The characteristic feature of the Wadsworth prism is that for the wavelength of the deflection minimum the ray exiting after the reflection on the mirror is parallel to, but offset from the entering ray. Therefore these rays impinge vertically on a detector which can now be disposed with its entry surface perpendicular to the optical axis of the SELFOC like in an image sensor without dispersion. The direct vision prism is a combination of prisms which does not give the entering light beam an overall deflection for a certain wavelength and can therefore have the same effect as a Wadsworth prism.

The lens aperture 6 arranged in the vicinity of the document 2 to be examined in FIG. 1, through which lens aperture the light 5 remitted by the document 2 passes, is preferably embodied as a slit with a slit width of between 0.1 and 0.2 mm, and behind the slit the row of SELFOC lenses 7 is arranged. Typical lengths of the slit of the lens aperture 6 are between 10 and 200 mm, preferably approximately 100 mm.

In a variation of this construction alternatively or additionally to the lens aperture 6 a line-shaped or stripe-shaped illumination of the partial area 19 of the document 2 to be examined can be provided. For this purpose a line-shaped light source can be used (not shown). Generally it is also possible to image the light of a punctiform light source in a line shape or stripe shape onto the document 2 with the aid of optical components.

It should be mentioned that alternatively or additionally also a measurement in transmission is possible or a different guiding of the radiation, e.g. with vertical illumination and/or measuring, can be realized with the aid of deflection mirrors or beam splitters.

Figure 2:
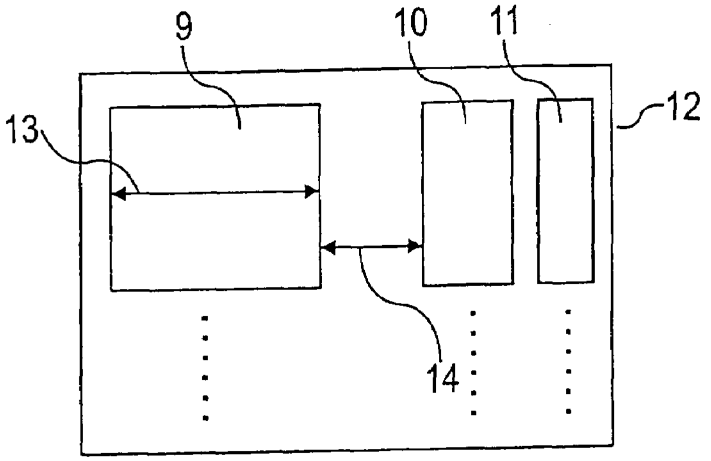
FIG. 2 a front view of the inventive detection devices.

FIG. 2 shows a front view of the detection devices 9, 10, 11 represented in FIG. 1. In the shown example of the FIG. 2 the detection devices 9, 10, 11 have different dimensions 13 and different spacings 14 from each other.

By the dimension 13 and the position of a detection device in a range of the spectrally divided light beam, wherein the position is also influenced by the spacing 14 between two adjacent detection devices, the sensitivity spectrum of the overall apparatus is influenced. In this manner a weighting of the individual spectral component which is detected by the respective detection device 9, 10, 11 can be achieved. For example the dimension 13 and/or the position of each of the detection devices 9, 10, 11 can be chosen in such a way that the detected spectrum is at least approximately adapted to the color perception of the human eye. This will be described in detail with reference to FIGS. 6 and 7 in the following. The dimension and the spacing of the detection devices 9, 10, 11 in the direction of the spectral division (i.e. in FIG. 2 in the horizontal direction) is above all predetermined by the dispersion, the width of the slit and the astigmatism. Perpendicularly thereto (i.e. in FIG. 2 in the vertical direction) preferably respectively several such detection devices 9, 10 or 11 are arranged one after another, so that in the specified case for example three detector lines can be established. Therein the size of the individual detection devices 9, 10, 11 of the individual detector lines can be constant and predetermined by the required resolution (e.g. 0.2 mm for a resolution of 125 dpi).

Figure 3:
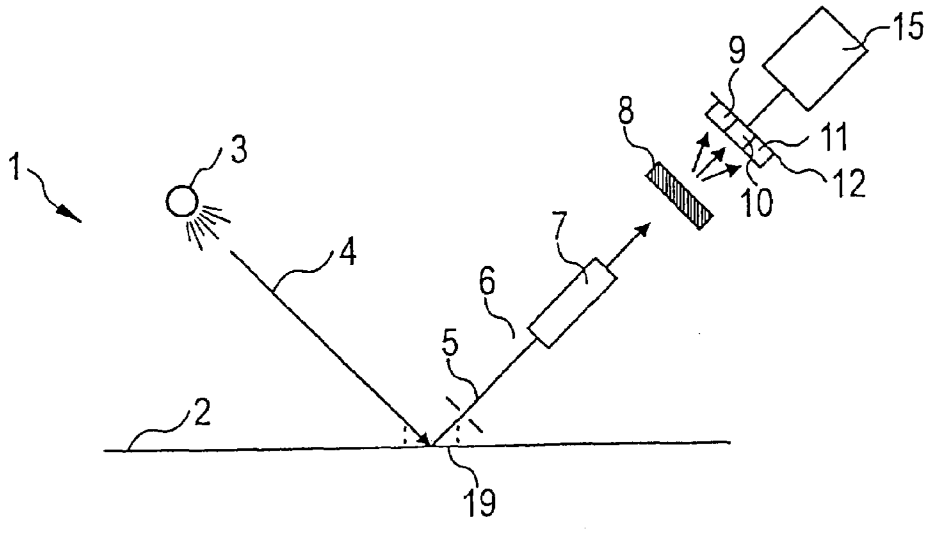
FIG. 3 the apparatus of FIG. 1 with a separate weighting means.

FIG. 3 shows the apparatus 1 of FIG. 1 with a weighting means 15 for the individual weighting of the spectral components respectively detected by the detection devices 9, 10, 11. The weighting means 15 can also be used in the above-described embodiments of the invention, since it can be adjusted to weight the detected spectral components dependent on or independent of the geometry of the detection devices 9, 10, 11. The spectral components are individually weighted depending on their intensities by means of weighting factors, wherein the weighting factors are dependent on the spectrum which is to be approximated. Therein it is for example ascertained in a silicon detector that the spectral component in the “red” spectral range has an overall intensity value X, but the value should amount to Y. Accordingly the weighting factor is adjusted in advance so that a value X is converted into a value Y. This adjustment is carried out for all spectral components to be detected in the calibration of the overall apparatus.

Figure 4:
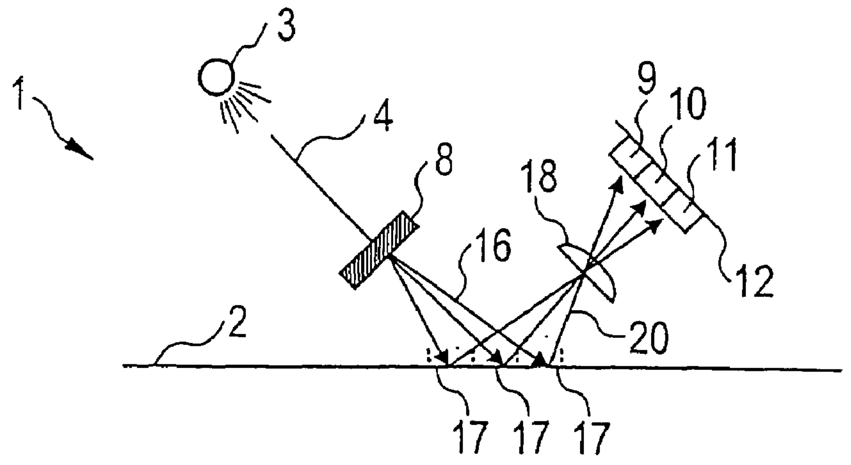
FIG. 4 a second embodiment of the apparatus for the examination of documents.

In the embodiments described so far the spectral device 8 is arranged between the document 2 and the detection devices 9, 10, 11, wherein the light 5 emanating from the document 2 is divided into several spectral components and these impinge on the corresponding detecting devices 9, 10, 11. In an alternative embodiment of the inventive apparatus 1 according to FIG. 4 the spectral device 8 is arranged between the light source 3 and the document 2. In this embodiment the light 16 impinging on the document 2 is divided into several spectral components by the spectral device 8, which components impinge on the document 2 in different partial areas 17 and are remitted from there. The spectral component 20 emanating from the respective partial areas 17 of the document 2 is finally imaged onto the corresponding detection devices 9, 10, 11, so that each of the detection devices 9, 10, 11 detects a different spectral component. The imaging onto the corresponding detection devices 9, 10, 11 is for example carried out with a convex lens 18 or a SELFOC lens 7 as imaging optics. Like in the examples described above, also in this embodiment a partial area 19 of the document 2 extending perpendicularly to the drawing plane and consisting of the individual partial areas 17 illuminated by different spectral components is examined and the light 20 emanating therefrom is detected by the corresponding detection devices 9, 10, 11.

In the embodiments described so far the light 5, 20 reflected by the document 2 is detected and used for the examination of the spectral properties of the document 2. Alternatively, it is possible in an analogous manner to detect and evaluate the light transmitted by the document 2, by arranging the detection devices 9, 10, 11, the spectral device 8 and the possibly required further optical components in the area of the side of the document 2 facing away from the light source 3.

Generally light sources 3 can be used which emit light with a continuous spectrum. Depending on the type of examination or verification of the documents 2 the emitted light 4 of the light source has components lying in the visible and/or invisible, e.g. infrared or ultraviolet, spectral range. As a principle, the light source 3 can also be assembled from several partial light sources, e.g. light emitting diodes, which respectively emit light with a different spectral composition. Also the use of incandescent lamps as light source 3 is possible.

Figure 5:
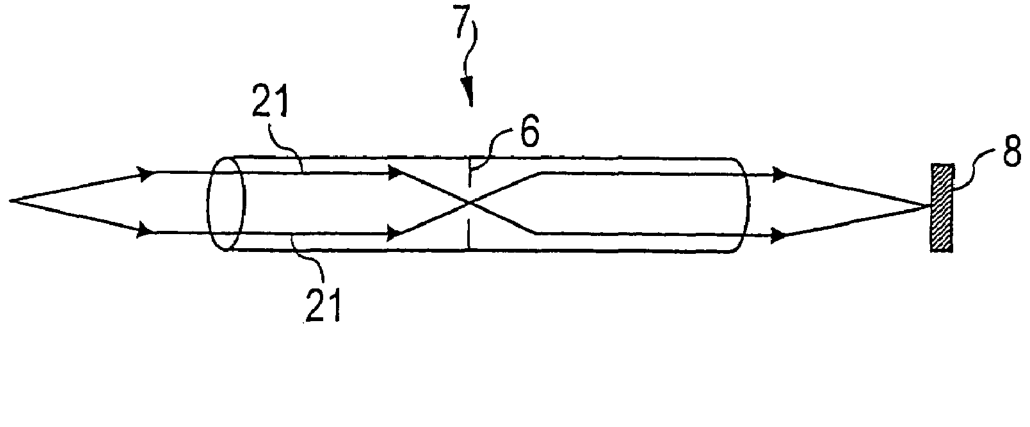
FIG. 5 an SELFOC lens with a lens aperture arranged therein.

FIG. 5 shows a SELFOC lens 7 with a lens aperture 6 arranged therein which can be used advantageously in the above-mentioned embodiments. The use of a lens aperture 6 is necessary since in spectrometers for measuring usually a predefined slit has to be given. In practice this is hard to achieve by means of a merely slit-shaped illumination of the document 2, due to the usual variations in position of the document 2. However, with the length of the SELFOC lens 7 predetermined for a 1:1 imaging, the light rays 21 passing through the lens form a waist in the center of the longitudinal axis of the lens. This waist of the light rays 21 is now used by shifting the defined slit to the center of the longitudinal axis of the SELFOC lens 7. For this purpose each of the SELFOC lenses 7 has a lens aperture 6 in the corresponding location. In order to produce a SELFOC lens 7 with a lens aperture 6 arranged therein, for example two halves (with reference to the length) of a SELFOC lens 7 can be assembled, wherein the lens aperture 6 is arranged between the halves. A corresponding inventive method of production for a SELFOC lens with slit aperture is hereinafter described with reference to FIGS. 8 A-D.

Figure 7:
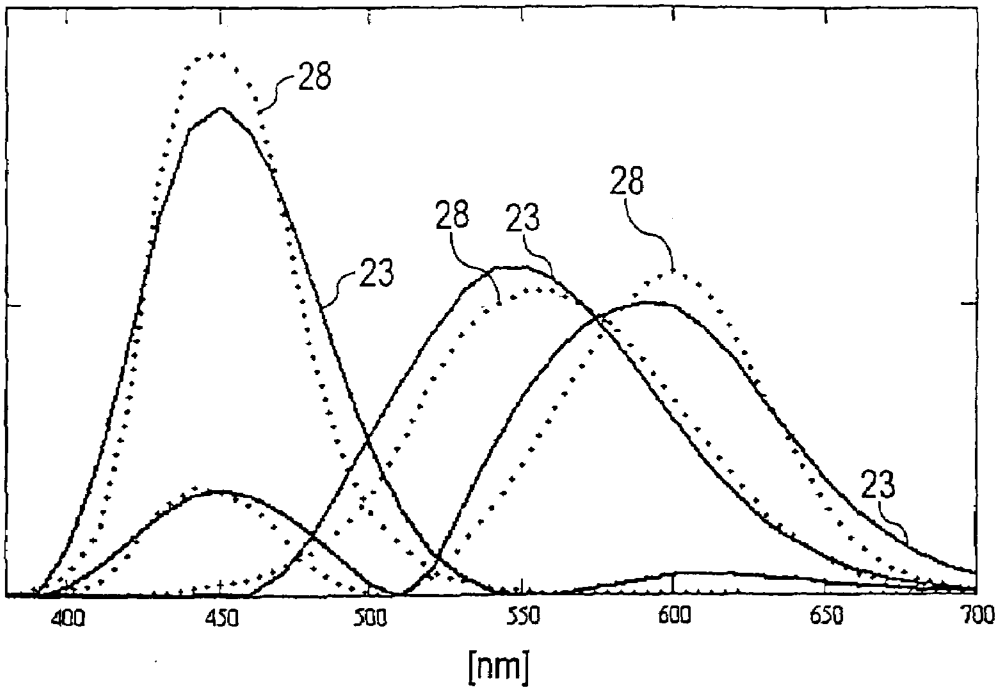
FIG. 7 the standard sensitivity spectrum of the human eye (dotted line) and a sensitivity spectrum (full line) approximated by means of a silicon detector of the geometry specified in FIG. 6 with a special filter (BG 38 filter)
Figure 6:
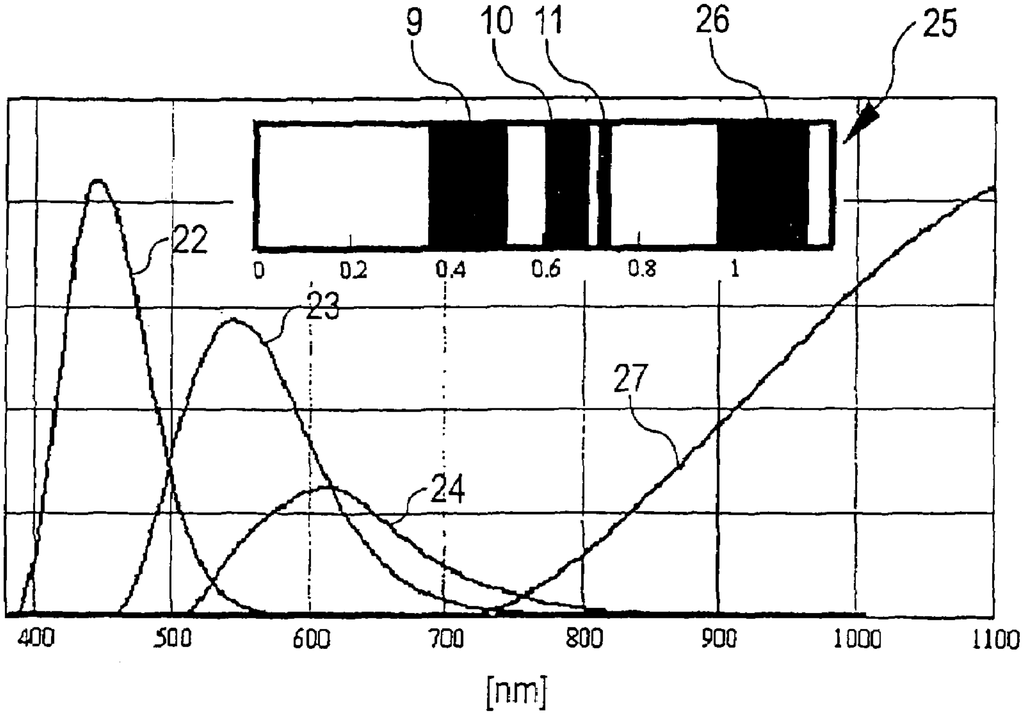
FIG. 6 the sensitivity spectrum of an embodiment of the invention and the corresponding geometry of the detection devices.

With reference to FIGS. 6 and 7 now the adaptation of the detection devices 9, 10, 11, 24 is explained, in order to detect the light spectrum in a manner which approximately corresponds to the color perception of the human eye.

According to the invention the spectral components detected by means of the detection devices 9, 10, 11, 24 are individually weighted in a preferably filterless apparatus 1 for the examination of documents 2, in order to adapt them to the color perception of the human eye. Correspondingly FIG. 6 shows spectrums 22 (blue), 23 (green), 24 (red) which were detected by the geometrical array 25 of four detection devices 9, 10, 11, 26 shown in the diagram of FIG. 7. Therein the three detection devices 9, 10, 11 on the left correspond to those of the embodiment of FIG. 2, in order to detect spectral components of the visible spectral range. The fourth detection device 26 serves the detection of a spectral component 27 of the infrared spectrum.

The dotted lines 28 in FIG. 7 represent the standard sensitivity spectrums of the human eye. The full lines 23 of FIG. 6 show the spectrums detected by means of a silicon detector and approximated to the standard sensitivity spectrums 28 of the human eye with a BG 38 filter (short pass filter for cutting off the near infrared in the red spectrum 25 of FIG. 6).

The four detection devices 9, 10, 11, 26 of different widths in the direction of dispersion shown in FIG. 6 are distributed on approximately 1 mm width, wherein the four detection devices 9, 10, 11, 26 are spaced apart from each other by different distances. Therein the dispersion direction was transverse to the line of the document 2 to be examined. Furthermore, for measuring a slit with a slit width of 0.2 mm and a 60° prism of crown glass (BK 7) with an average refraction index n of approximately 1.52 were used. In this case, the deflection angle amounts to approximately 40° at a wavelength of 400 nm, wherein the dispersion reduces this angle up to 1100 nm by a little more than 2°.

The individual detection devices 9, 10, 11, 26 can for example be based on silicon. Therein the detection devices 9, 10, 11, 26 for an approximation of the color perception of the human eye for the detection of spectral components of the "blue" (left) and the "infrared" (right) spectral range, as shown in FIG. 6, must have a comparatively great dimension 13, since silicon is less sensitive to these wavelength ranges than for other wavelength ranges.

As is shown by a comparison of the FIGS. 6 and 7, in the visible spectral range (approximately 380 to 750 nm) the spectrum of the FIG. 7 detected by the four-color line sensor is relatively well approximated to the standard sensitivity spectrum 22 of the human eye in accordance with FIG. 6. Thus by means of the individual weighting of the spectral components, for example through a detector with four parallel detection devices 9, 10, 11, 26 of different dimensions 13, a color-accurate evaluation of documents 2, in particular banknotes, is possible.

Whereas it was described above exemplarily with reference to FIG. 6 to provide four detection devices 9, 10, 11, 26, also a different number of detection devices may be present. According to a different preferred variant, the array 25 will have five detection devices. For example between the detection devices 9 and 10 a further detection device corresponding to the color cyan can be provided. In such a case, for the purpose of data reduction, preferably four color values are deduced from the measured five color values, on the basis of which four values in turn measuring spectrums 22 to 24 corresponding to the standard sensitivity spectrum 22 of the human eye are produced.

FIGS. 8 A-D show an inventive method for the production of a SELFOC lens 7 with slit aperture 6. Therein FIGS. 8A and 8B show the two basic steps of the method. In a first step of the method (FIG. 8A) a SELFOC lens 7 is split in its center plane in a direction perpendicular to its optical axis, in order to insert a slit aperture 6 inside the lens (FIG. 8B). In order to avoid tolerance problems which can arise with a view to the slit width and the position of the slit aperture 6 relative to the optical axis, the lens aperture 6 is produced photographically.

Figure 8A:
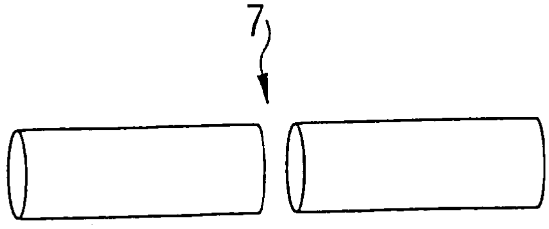
FIGS. 8A-D an inventive method for the production of an SELFOC lens with a photographically produced slit aperture according to a first variant.
Figure 8B:
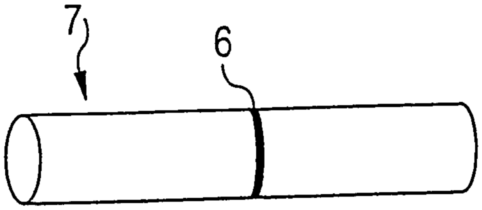
Figure 8C:
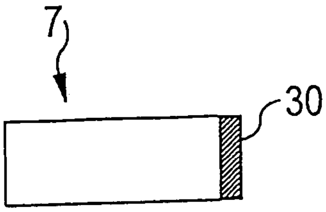
Figure 8D:
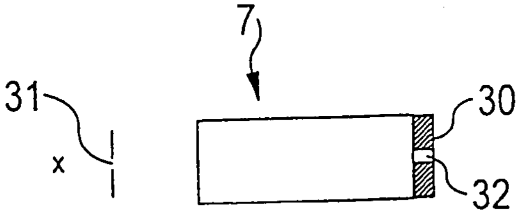

For this purpose in a first variant a positive photoresist 30 is used which, as is shown in FIG. 8C, is applied directly to a front surface, preferably to a parting plane of the SELFOC lens half produced by the splitting of the SELFOC lens. The photoresist 30 is subsequently irradiated through an opening 31 as shown in FIG. 8D, wherein the opening 31 is arranged on a side opposite the photoresist 30. The opening 31 has the shape of the slit aperture 6 to be produced and is arranged in the object plane. Due to the properties of the SELFOC lens 7 the photoresist 30 is illuminated and developed only locally. Therein the opening is imaged in the photoresist 30 in a reduced dimension. In measurements carried out the width of the slit aperture 6 amounted to 0.24 times the width of the opening 31. The exposed photoresist structure 32 then forms the required slit aperture 6 which is optimally adapted to the properties of the SELFOC lens 7. The two parts of the SELFOC lens 7 are assembled again after the production of the slit aperture 6, as is shown in FIG. 8B.

Figure 9:
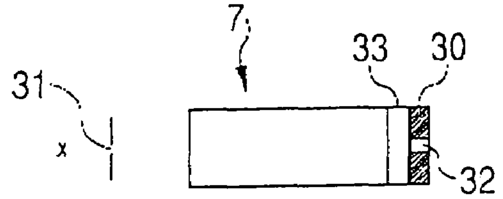
FIG. 9 a second variant of the photographical production of the slit aperture.

FIG. 9 shows a second variant for the production of the slit aperture. In contrast to the first variant, the positive photoresist 30 is applied to a substrate 33, since this can be realized more easily from a technical point of view. The substrate 33 is then applied to a front surface of the split SELFOC lens. Of course also the positive photoresist 30 can be applied to the front surface instead of the substrate 33 before the SELFOC lens is irradiated through the opening 31.

Figure 10:
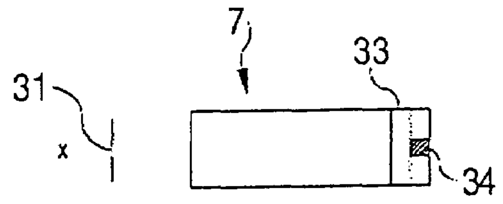
FIG. 10 a third variant of the photographical production of a slit aperture.

FIG. 10 shows a third variant for the production of the slit aperture. Here a negative photoresist 34 is first applied to a substrate 33 and the substrate 33 is subsequently applied to the front surface of a lens half of the split SELFOC lens 7. After the exposure through the opening 31 and the development of the negative photoresist 34 the substrate 33 can be used for example as a lift-off mask (coating mask) for a later metallization or for the production of a whole batch of SELFOC lenses, since the negative photoresist 34 remains on the substrate 33 in the shape of the desired slit aperture.

Figure 11:
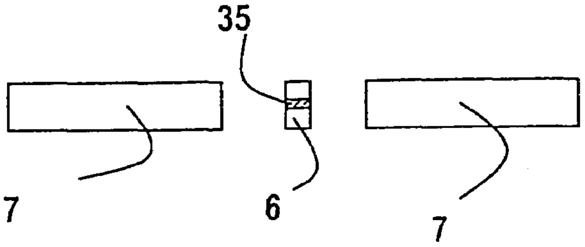
FIG. 11 a further variant with a lens aperture arranged between two SELFOC lenses.

It was described above to dispose a lens aperture within a SELFOC lens in particular by means of a photolithographic method. As an alternative hereto it is also discernible to dispose the lens aperture 6 between two SELFOC lenses 7, as is illustrated in FIG. 11. By means of a not shown mechanical connecting element, such as e.g. a fixing bushing or a surrounding casting compound which is not present in the beam path itself, the two SELFOC lenses 7 and the lens aperture 6 can be connected to each other firmly as a separate component. As is shown in FIG. 11 the lens aperture 6 with the aperture slit 35 can also be disposed at a certain distance to the two surrounding SELFOC lenses 7. Alternatively the lens aperture 6 can also be brought into direct contact with the two surrounding SELFOC lenses 7.

Figure 12:
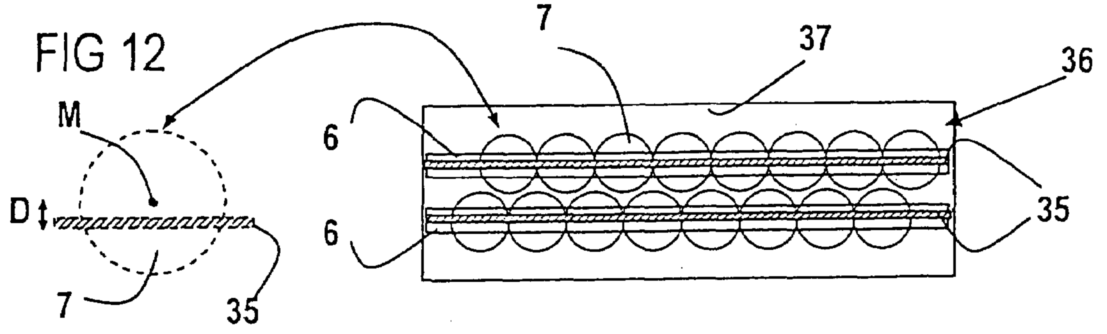
FIG. 12 a schematic cross section of a two-row array of SELFOC lenses with corresponding lens apertures.

FIG. 12 shows a schematic cross view of a two-row array 36 of SELFOC lenses 7, wherein to each of the two rows of SELFOC lenses 7 a rectangular lens aperture 6 with an aperture slit 35 is allocated, which lens aperture extends in the direction of the row and which covers all SELFOC lenses 7 of the corresponding row. In FIG. 12 it is especially outlined that in a plane behind the plane of the lens apertures 6 the two rows of SELFOC lenses 7 are disposed. In a plane in front of the plane of the lens apertures 6 in addition two corresponding rows of SELFOC lenses are disposed which are not shown in FIG. 12 for clarity's sake. The arrangement of these two planes of SELFOC lenses 7 and lens apertures 6 disposed in-between in a lateral view corresponds e.g. to the representation of FIG. 11. At least the SELFOC lenses 7 in the plane behind and/or in front of the lens apertures 6, however preferably the overall assembly of two SELFOC lens planes with lens apertures 6 disposed in-between, are cast into a casting compound 37 and thus fixed in relation to each other.

Figure 13:
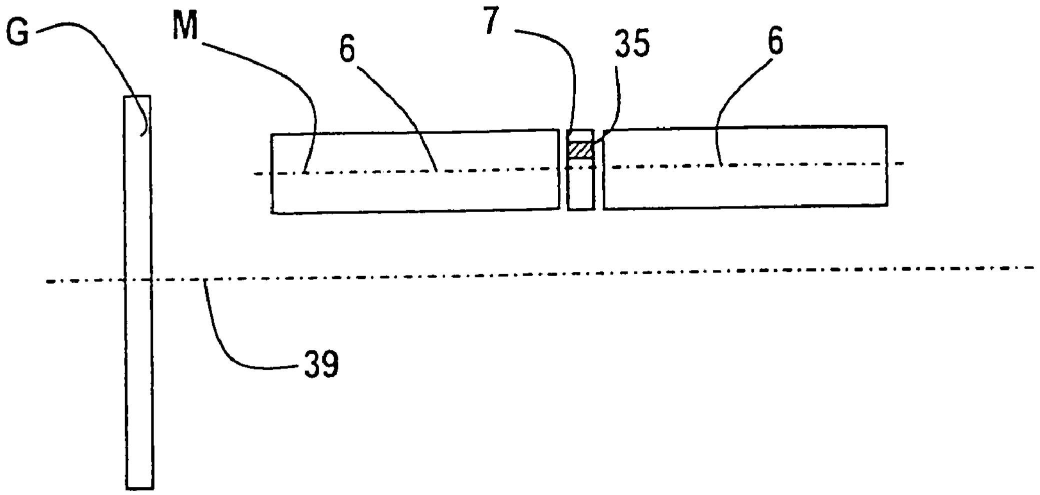
FIG. 13 a schematic view of a part of the array of FIG. 12.

It should be mentioned that in an array 36 of SELFOC lens pairs 7 with lens apertures 6 disposed in-between, as is illustrated exemplarily in FIG. 12 with two rows of SELFOC lens pairs 7, the plane of the aperture slits 35 of the lens apertures 6 is preferably disposed offset from the optical axis of the SELFOC lenses 7. This is illustrated in magnification in the left portion of FIG. 12 using the example of a SELFOC lens 7 with corresponding lens aperture. In the specific case the aperture slit 35 is offset by a distance D in relation to the optical axis M extending through the central point of the SELFOC lens 7, perpendicular to the sheet plane. This has turned out to be advantageous for the improvement of the imaging properties of the array 36 of SELFOC lenses 7. This is due to the fact that when the SELFOC lens 7 does not lie in the optical axis 39 of the object G to be imaged, the object G is thus shifted to the side, the intermediate image is not disposed in the center M of the SELFOC lens 7 either. This correlation is illustrated in FIG. 13.

Figure 14:
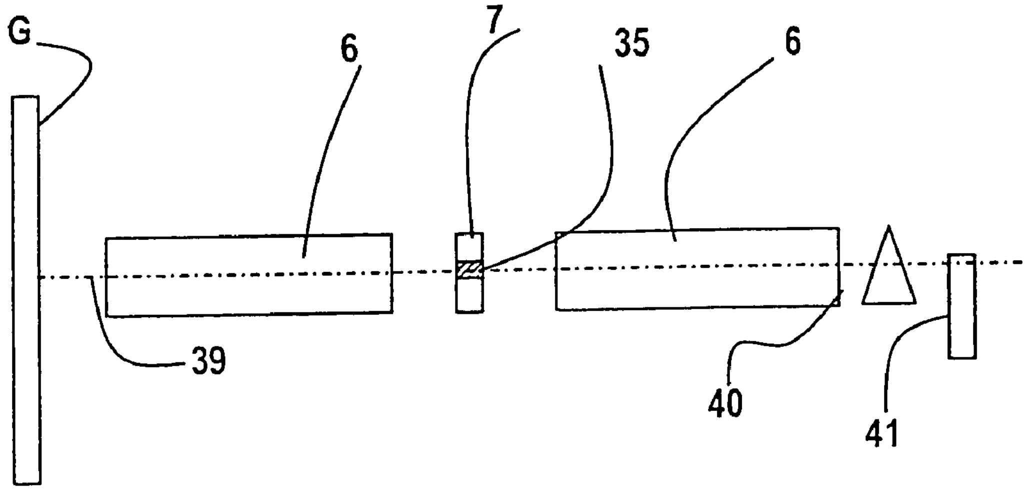
FIG. 14 another variant with a lens aperture arranged between two SELFOC lenses.

FIG. 14 shows another preferred variant similar to FIG. 11, wherein in the center between two SELFOC lenses 6 a slit, i.e. a lens aperture 7 is arranged. The radiation emanating from an object G to be imaged is divided into spectral components via this SELFOC-lens aperture system 6, 7, 6 by means of a prism 40 and deflected to a detector 41 which can be embodied as described within the framework of the present invention.

As an especially preferred variant it was described to use a detector with 4 or 5 color channels. Alternatively also an array of more than 5, preferably more than 100 detector elements can be used. Herein the reduced number of e.g. four colors to be evaluated is deduced from the measured values of the individual detector elements as described above exemplarily for the case of a detector with 5 detector elements.

Specifically according to this variant also a CCD or CMOS image sensor chip can be used which has detector elements of equal size in the direction of the spectral division. It is a shortcoming of this solution that very many pieces of information are measured, which renders the measuring evaluation complex. However, it is a particular advantage of this variant that the color sensitivity curves, e.g. according to FIG. 6, can be adjusted also subsequently via changes of the software, without the necessity of constructing and inserting a new detector. Furthermore, a simple adjustment of the array is possible.

The invention claimed is:

1. Apparatus for the examination of documents, comprising:

at least one light source for illuminating a document to be examined with light, at least one lens aperture, at least one SELFOC lens, and at least one detection device for detecting light which emanates from a document to be examined, wherein the lens aperture is arranged within the SELFOC lens or between two SELFOC lenses, and wherein the SELFOC lens having the lens aperture there within or the two SELFOC lenses having the lens aperture there between is/are arranged between the document to be examined and the at the least one detection device.

2. Apparatus according to claim 1, including at least one spectral device arranged to divide light into at least two spectral components, at least two detection devices arranged to detect light which emanates from the document to be examined, wherein the spectral device and the detection devices are arranged in such a manner that the detection devices respectively only detect one spectral component of the light divided by the spectral device.

* * * * *